United States Patent [19]

Lee

[11] Patent Number: 4,900,888
[45] Date of Patent: Feb. 13, 1990

[54] HOLDER FOR WIRE-ARC DISCHARGE CUTTING MACHINERY

[76] Inventor: Chin-Jen Lee, No. 1-7, Lane 248, Chung Chen Rd., Shu Lin Chen, Taipei Hsien, Taiwan

[21] Appl. No.: 351,452

[22] Filed: May 12, 1989

[51] Int. Cl.[4] .................. B23H 1/00; B23H 7/02; B23Q 3/154
[52] U.S. Cl. ........................ 219/69.11; 219/69.12; 269/8
[58] Field of Search .............. 219/69.1, 69.11, 69.12; 204/297 M; 269/8, 303, 309, 900; 198/345, 817

[56] References Cited

U.S. PATENT DOCUMENTS

| | | | |
|---|---|---|---|
| 4,518,155 | 5/1985 | Lehmann | 269/309 |
| 4,616,796 | 10/1986 | Inoue | 269/8 |
| 4,757,178 | 7/1988 | Iwasaki et al. | 219/69.1 |
| 4,786,776 | 11/1988 | Ramsbro | 219/69.12 |

FOREIGN PATENT DOCUMENTS

| | | | |
|---|---|---|---|
| 61-56830 | 3/1986 | Japan | 219/69.11 |
| 863684 | 3/1961 | United Kingdom | 269/8 |

Primary Examiner—A. D. Pellinen
Assistant Examiner—Geoffrey S. Evans
Attorney, Agent, or Firm—Renner, Otto, Boisselle & Sklar

[57] ABSTRACT

A holder for wire-arc discharge cutting machinery including two orthogonal seats and a number of blocks. Each seat has a rectangular flange extending along a length of the seat at its lower edge. Each seat has a magnetic insert and an insulating layer extending along a length of the seat. Each magnetic insert is attached to a bar provided in the slot of each seat for controlling an ON/OFF condition of the magnetic insert. The blocks are fastened to two adjacent sides of a processing material and then attached to the seats and the flanges before processing. The processing material and the blocks are attracted to the flanges of the seats by the magnetic inserts when the bars are at an ON position.

3 Claims, 8 Drawing Sheets

HOLDER FOR WIRE-ARC DISCHARGE CUTTING MACHINERY

BACKGROUND OF THE INVENTION

The processing of molds or materials with specific shapes have changed a great deal due to the emergence of wire-arc discharge cutting machinery. The advantages of wire-arc discharge cutting machinery include: highly accurate processing, short processing time, reduction of cost and reduction of design time for the mold. Although discharging processing machinery offers so many advantages, there are still some restrictions thereon, especially in the holder.

Referring to FIGS. 6 and 6A, a conventional holder for discharging processing machinery is shown. The holder 51 utilized in a wire-arc discharge cutting machinery is provided on a frame 5 to hold a processing material 3. A pre-set holding clearance 32 is necessary for the holder 51 to hold the processing material 3 and causes inconvenience while processing. Furthermore, the lower nozzle 41 of the cutting machinery must "face" the processing material in such a manner that the clearance between the processing material 3 and the lower nozzle 41 is in a range not exceeding 0.05 to 0.1 mm. Additionally, there is a dead angle for processing when the lower nozzle 41 and the upper nozzle 4 collide with the holder or frame during the cutting.

In order to eliminate the disadvantages of the above-mentioned holder, some people put the holder seat 7 on the flanges 63 of the fixed seats 6 (See FIG. 7). Movable locking means 61 and tracks 62 provided on each fixed seat 6 and tracks 72 on the holder seat 7 are accommodated to fasten the holder seat 7. The processing material 3 on the flange 73 is fastened to of the holder seat 7 by movable fastener 71. This holder can resolve the inconvenience and limitation of processing the edges of the processing material. However, the clearance between the processing material 3 and the lower nozzle 41 is greater than the overall height of the flange 63 and exceeds 0.1 mm. The cutting rate is largely reduced. Furthermore, the upper nozzle 4 might touch the fastener 51 and cause inconvenience during processing.

As can be seen in FIG. 8, another improved conventional holder is shown. In such holder, adjusting holes 82 and adjusting means 81 are provided on a holder seat 8. The holder seat 8 further includes an inclined surface to which the holder seat 9 is attached. Fastening means 91 are provided to fasten the processing material 3. By inserting the adjusting means 81 into the adjusting holes 82, the position of the processing material 3 can be corrected. This kind of holder is precise in processing. Nevertheless, a skilled operator is required to proceed with the adjustment; furthermore, this kind of holder is expensive. In addition, it does not fit to large materials 3 since the holding strength of the fastening means 91 is limited.

SUMMARY OF THE INVENTION

The present invention relates to a holder for wire-arc discharge cutting machinery, comprising two orthogonal seats and a plurality of blocks. Each seat has a respective rectangular flange extending along a lower edge thereof. Magnetic inserts and insulating layers are provided in each seat which extend along a length of the seats. The magnetic inserts are permanent magnets and connected to a bar provided in a slot provided on the middle portion of each seat to control an ON/OFF function of the magnetic flux.

Each block is fastened to two adjacent sides of the processing material and attaches to the seats and the flanges before processing. The processing material and the blocks are attracted to the flanges and the seats by the magnetic inserts therein (when the bar is at an ON position). Each block may further comprise a centrally located countersink with a re-usable countersink bolt provided therein.

It is a primary object of the present invention to provide a holder having seats with magnetic inserts provided therein to cooperate with blocks to fasten the processing material.

It is another object to limit the clearance between the nozzles and the processing material in a desired range by the blocks in order not to affect the cutting speed.

It is still another object of the present invention to provide a holder suitable for various sizes of processing materials.

It is yet another object of the present invention to eliminate the dead angle of processing by providing the blocks.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
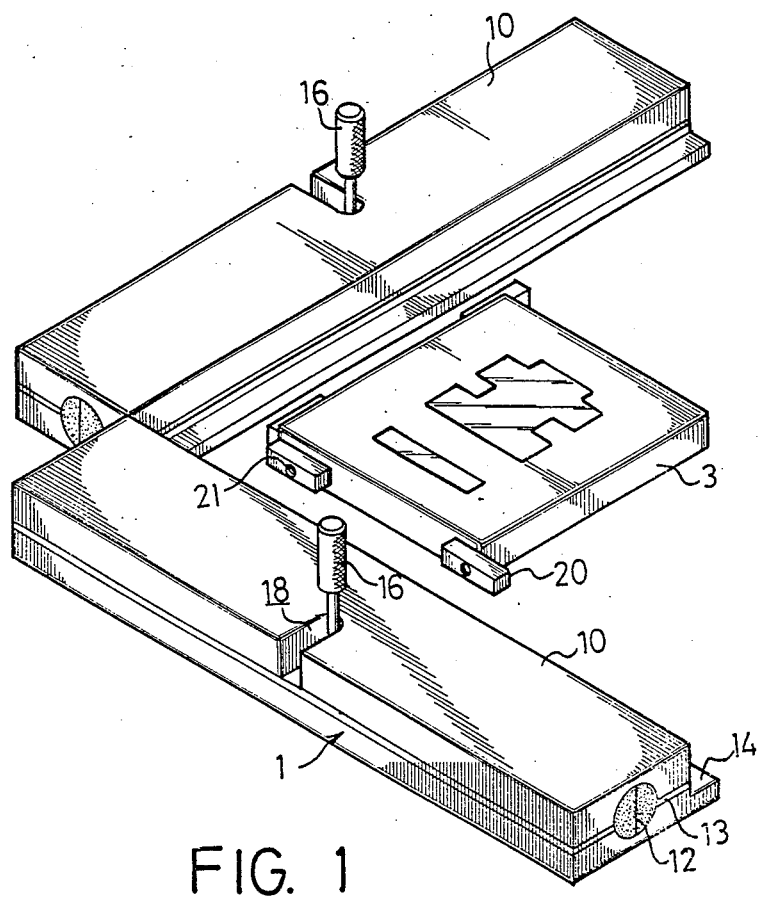
FIG. 1 is a perspective view of a holder for wire-arc discharge cutting machinery in accordance with the present invention and a processing material to be processed.

Referring now to FIG. 1, a holder 1 for wire-arc discharge cutting machinery in accordance with the present invention is shown. The holder 1 comprises two orthogonal rectangular seats 10 and a plurality of rectangular blocks 20. Each seat 10 has a rectangular flange 14 extending along a length of the seat 10 at a lower edge of the seat 10. Each seat 10 has a respective insulating layer 13 disposed therein and extending along a length of each seat 10. Each insulating layer 13 is at a height greater than the flange 14 and less than the overall height of the flange 14 and the blocks 20. Each seat 10 has a cylindrical permanent magnetic insert 12 provided between the seat and the flange. Each magnetic insert 12 extends along a length of each seat 10 and separates each respective insulating layer 13 into two parts. A bar 16 is attached to each magnetic insert 12 through a slot 18 provided on a middle portion of each seat 10 to control the on/off condition of each magnetic insert 12.

Figure 5A:
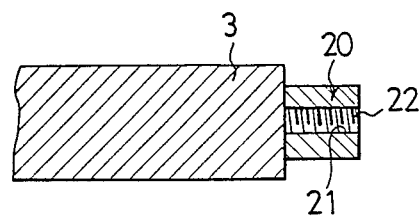
FIG. 5A, 5B and 5C are cross-sectional views showing the separation of the block and the processing material after processing.

Each block 20 has a centrally located countersink 21 with a countersink bolt 22 provided therein, as shown in FIG. 5A. The length of the countersink bolt 22 is less than the length of the countersink 21. The block 20 is preferably made of ferrous material.

Figure 2:
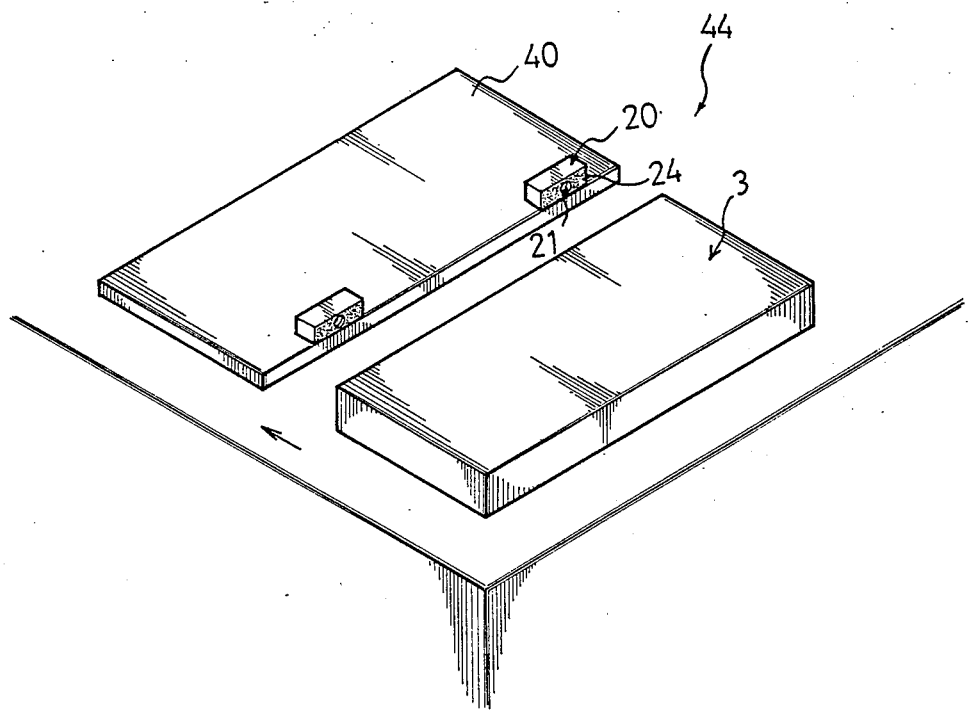
FIG. 2 is a perspective view showing the engagement of blocks of a holder in accordance with the present invention and a processing material before processing.

The blocks 20 are attached to the processing material 3 on a flat plate 40 ore processing. Referring now to FIG. 2, respective blocks 20 are first placed and aligned on the flat plate 40 having a height equal to the height of the flanges 14, wherein the edge surfaces 24 of the blocks align with an edge of the plate 40. The surfaces 24 which have an open end of the countersink 21 face outwardly and are supplied with adhesive to fasten with an associated side of the processing material 3. The above steps are repeated to fasten other respective blocks 20 onto the adjacent side of the processing material 3. The blocks 20 are preferably attached to the processing material 3 in a stable and balanced manner, as shown in FIG. 1. The proceeding of the attachment of the blocks 20 and the processing material 3 is on a flat surface 44 in order to have a precise alignment.

Figure 3:
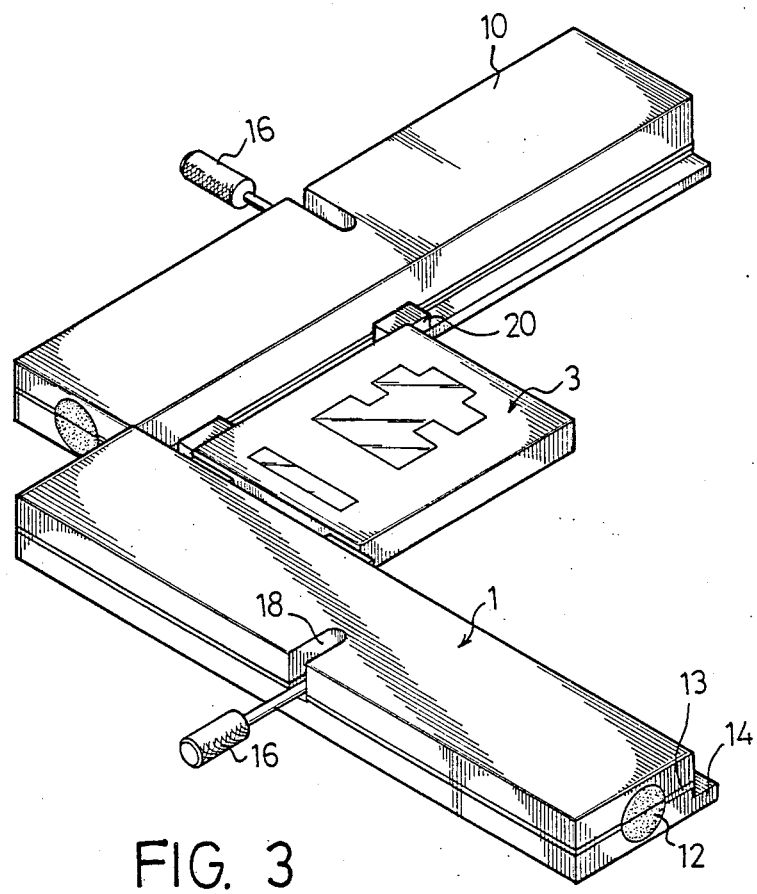
FIG. 3 is a perspective view of a holder in accordance with the present invention, showing the engagement of the holder and a processing material, with the bar in ON position.
Figure 4:
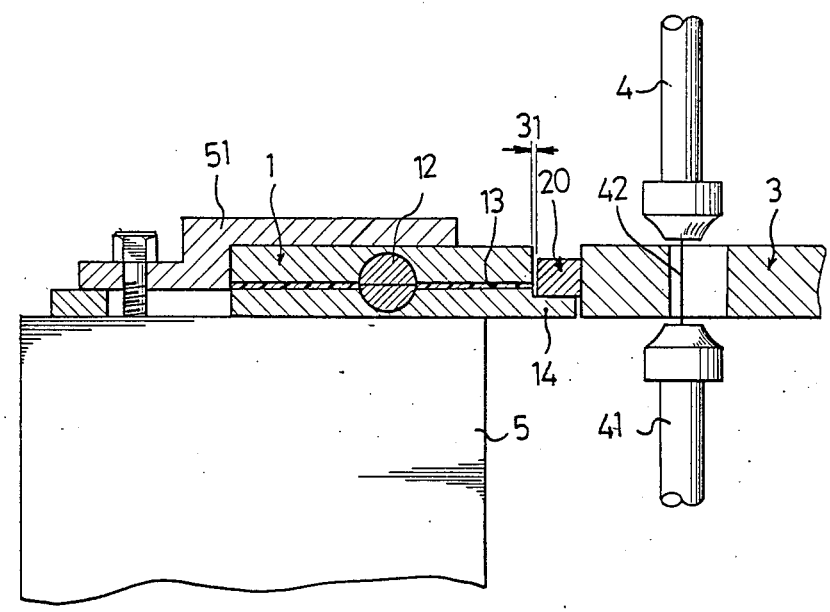
FIG. 4 is a cross-sectional view of a holder in accordance with the present invention, wherein the holder is placed on a working plate of a wire-arc discharge cutting machine.

Referring to FIGS. 3 and 4, the processing material 3 is then placed on the seats 10 in such a manner that the bottom surface of the processing material 3 is placed on the same level as the bottom surface of the seats 10 and flanges 14. A bottom surface of each block 20 is placed on the top surface of the associated flanges 14 since the height of the plate 40 equals to the height of the flanges 14. The sides of the blocks 20 and the seat 10 opposite to each respective side attached to the processing material 3 have a clearance 31 therebetween for magnetic flux to pass therethrough (see FIG. 4). The processing material 3 and the blocks 20 are attracted to the flanges 14 by the permanent cylindrical magnetic inserts 12 when the bar 16 is at an ON position (as shown in FIG. 3) due to the magnetic force. In this ON condition, two poles (the N pole and the S pole) of each magnetic inserts 12 are perpendicular to each insulating layer 13. Reversely, when the bar 16 is in OFF position (for example, by moving each bar 16 to a new direction which is perpendicular to the original ON position of each bar 16), two poles of each magnetic insert 12 are parallel to each insulating layer 13.

Referring now to FIG. 4, a processing material 3 held by a holder 1 in FIG. 3 is placed on a working plate of a wire-arc discharge machinery. A fastener 51 is provided on a frame 5 to fix the holder 1 and the processing material 3. Since the bottom of the seats 10 and the processing material 3 are on the same plane, the lower nozzle 41 does not touch the flange 14 during the processing, the dead angle of the processing is eliminated. Furthermore, the clearance between the lower nozzle 41 and the processing material 3 and the upper nozzle 4 and the processing material 3 are also limited to a desired range due to the provision of the blocks 20.

Figure 5B:
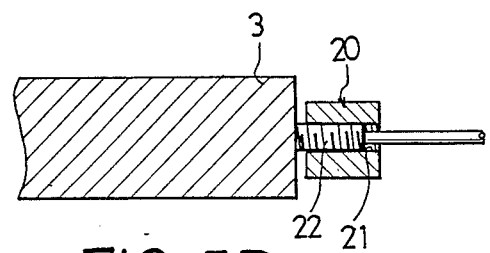
Figure 5C:
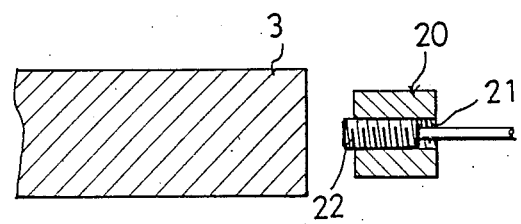
Figure 6A:
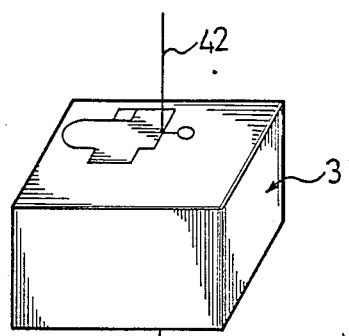
FIG. 6A is a perspective view of the conventional holder of FIG. 6.
Figure 6:
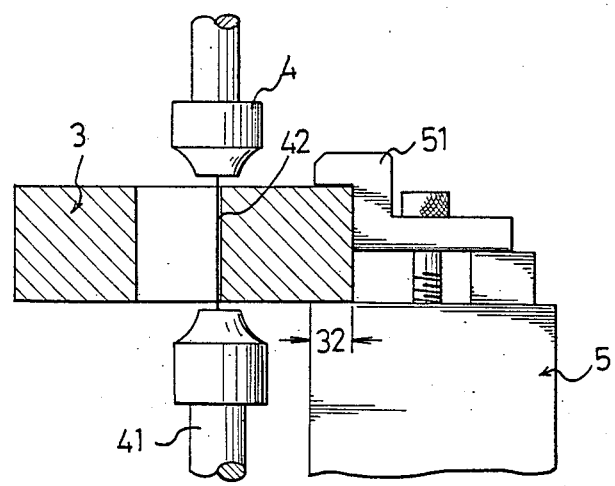
FIG. 6 is a cross-sectional view of a conventional holder on a working plate of a wire-arc discharge cutting machine.
Figure 7:
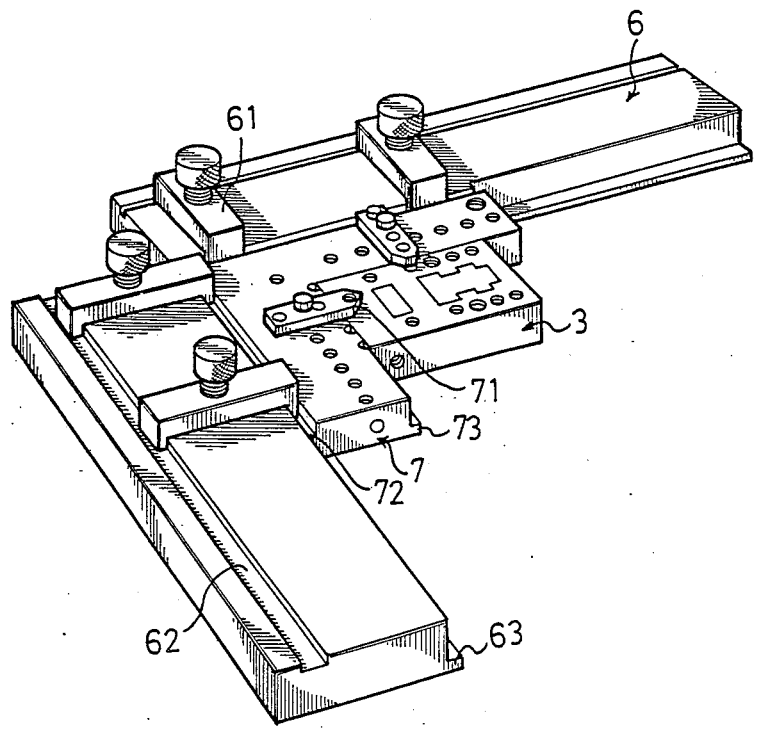
FIG. 7 is a perspective view of another conventional holder with adjusting means and adjusting holes provided thereon.
Figure 8:
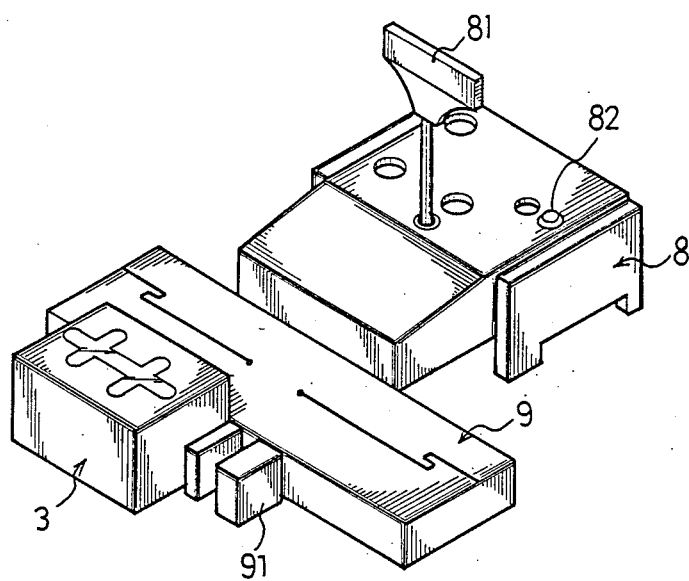
FIG. 8 is a perspective view of still another conventional holder using locking means and tracks to hold the processing material.

Referring now to FIGS. 5A, 5B and 5C, when the material 3 is processed, each bar 16 is moved to an OFF position and removing the processing material 3 from the processing machine. Then, the countersink bolt 22 is turned in the countersink 21 via a screwdriver so as to separate the material 3 and the blocks 2 due to the opposite force. The blocks 2 are re-usable to reduce the cost.

The holder in accordance with the present invention is adaptable to various sizes of processing materials. In addition, correction is easily achieved and cutting accuracy is provided by the blocks.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A holder for wire-arc discharge cutting machinery comprising:
   two orthogonal rectangular seats, each seat having a respective rectangular flange extending along a length of said seat at a lower edge thereof; each seat having a respective insulating layer disposed therein and extending along a length of each said seat, each said insulating plate being at a height greater than said flange and less than an overall height of said flange and said blocks; each said seat having a respective cylindrical permanent magnetic insert provided between said seat and said flange; each said magnetic insert extending along a length of each said seat and separating each said respective insulating layer into two parts; a bar being attached to each said magnetic insert through a slot provided on a middle portion of each said seat to control an ON/OFF condition of each said magnetic insert;
   a plurality of rectangular blocks, respective blocks being fastened to two adjacent sides of a processing material and attaching to said seats and said flanges at one side before processing wherein a bottom surface of the processing material is placed on a same level of a bottom surface of said seat and flange, a bottom surface of each said block being placed on a top surface of said flanges, an opposite side of each respective said side of each said block and each respective said seat having a clearance therebetween for magnetic flux to pass therethrough; the processing material and said blocks being attracted to said flanges by said magnetic inserts when said lever is at an ON position.

2. A holder as claimed in claim 1, wherein two poles of each said magnetic insert are perpendicular to each respective said insulating layer when said bar is at said ON position, said two poles of each said magnetic insert parallel to each respective said insulating layer when said bar is at an OFF position.

3. A holder as claimed in claim 1, wherein each said block has a centrally located countersink with a countersink bolt provided therein; a length of said countersink bolt being less than a length of said countersink; each said block being adhered to the processing material at one face thereof before processing at a height equal to a height of said flanges, each said block being re-usable by separating said block from the processing material after processing via a screwdriver turning said countersink bolt.

* * * * *